United States Patent
Jang (10) Patent No.: US 9,915,218 B2
(45) Date of Patent: Mar. 13, 2018

(54) LEARNING METHOD FOR CONTROLLING OPENING OR CLOSING OF INTAKE/EXHAUST VALVE OF VEHICLE AND LEARNING APPARATUS FOR THE SAME

(71) Applicant: Hyundai Motor Company, Seoul (KR)

(72) Inventor: Hwa-Yong Jang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/350,884

(22) Filed: Nov. 14, 2016

(65) Prior Publication Data

US 2017/0268452 A1    Sep. 21, 2017

(30) Foreign Application Priority Data

Mar. 16, 2016 (KR) ........................ 10-2016-0031334

(51) Int. Cl.
- *F02D 29/02* (2006.01)
- *F02D 41/26* (2006.01)
- *F02D 41/00* (2006.01)

(52) U.S. Cl.
CPC ........... *F02D 41/263* (2013.01); *F02D 29/02* (2013.01); *F02D 41/0002* (2013.01); *F02D 41/0052* (2013.01); *F02D 2041/0015* (2013.01); *F02D 2041/0017* (2013.01); *F02D 2200/602* (2013.01)

(58) Field of Classification Search
CPC ...... F02D 29/02; F02D 41/00; F02D 41/0002; F02D 41/0052; F02D 2041/0015; F02D 2041/0017; F02D 41/263; F02D 2200/602
See application file for complete search history.

(56) References Cited

U.S. PATENT DOCUMENTS

| | | | | |
|---|---|---|---|---|
| 5,272,871 A | * | 12/1993 | Oshima | B01F 5/0451 60/274 |
| 5,517,410 A | * | 5/1996 | Nakagawa | F16H 61/0213 701/110 |
| 6,247,311 B1 | * | 6/2001 | Itoyama | F02B 37/24 60/602 |

FOREIGN PATENT DOCUMENTS

| | | |
|---|---|---|
| JP | 2003-138971 A | 5/2003 |
| JP | 2004-353586 A | 12/2004 |
| JP | 2009-287515 A | 12/2009 |
| JP | 2010-071186 A | 4/2010 |
| JP | 2011-252406 A | 12/2011 |
| KR | 10-2003-0044103 A | 6/2003 |
| KR | 2004-0041584 A | 5/2004 |
| KR | 10-0774683 B1 | 11/2007 |

* cited by examiner

*Primary Examiner* — Hieu T Vo
(74) *Attorney, Agent, or Firm* — Mintz Levin Cohn Ferris Glovsky and Popeo, P.C.; Peter F. Corless (57) ABSTRACT

A learning method for controlling opening or closing of an intake/exhaust valve of a vehicle may include a state determining step determining whether a vehicle state satisfies a learning entry condition, a learning frequency determining step determining whether a learning frequency is less than a preset reference frequency after the vehicle starts, when the vehicle state satisfies the learning entry condition, a change learning step learning an area of an inflow passage of the intake/exhaust valve that is changed due to a deposition of impurities, when the learning frequency while driving is less than the preset reference frequency after the vehicle starts, and an escape condition determining step determining whether the vehicle state satisfies a learning escape condition, after the learning step.

20 Claims, 7 Drawing Sheets

LEARNING METHOD FOR CONTROLLING OPENING OR CLOSING OF INTAKE/EXHAUST VALVE OF VEHICLE AND LEARNING APPARATUS FOR THE SAME

CROSS-REFERENCE TO RELATED APPLICATION

This application claims under 35 U.S.C. § 119(a) the benefit of Korean Patent Application No. 10-2016-0031334, filed on Mar. 16, 2016, the entire contents of which are incorporated by reference herein.

BACKGROUND (a) Field of the Invention

The present invention relates to a learning method and a learning apparatus for controlling opening or closing of an intake/exhaust valve of a vehicle, more particularly, to a learning method and a learning apparatus capable of preventing noise that occurs upon learning a changed area of an inflow passage of the intake/exhaust valve, in order to avoid discomfort to vehicle occupants, and improve marketability of the vehicle.

(b) Description of the Related Art

A vehicle to which a diesel engine is applied includes a plurality of intake/exhaust valves. Types of intake/exhaust valves include: an exhaust gas recirculation valve (EGR valve), an air control valve (ACV), a swirl control valve (SCV), etc.

Among those, the EGR valve serves to control the amount of exhaust gas re-circulated to the intake side of the engine, in an exhaust gas recirculation (EGR) system that re-circulates some of the exhaust gas to an intake manifold to reduce NOx occurring at a high temperature in the exhaust gas.

However, if various kinds of incomplete combustion materials included in the exhaust gas are introduced into the intake side of the engine by the EGR, soot is deposited at a portion of an inflow passage of the foregoing EGR valve. Therefore, the inflow passage of the EGR valve is continuously narrow and the amount of re-circulated exhaust gas is reduced. Accordingly, upon mapping a control map determining whether to open and close the EGR valve, an emission is likely to exceed a reference value.

Figure 2:
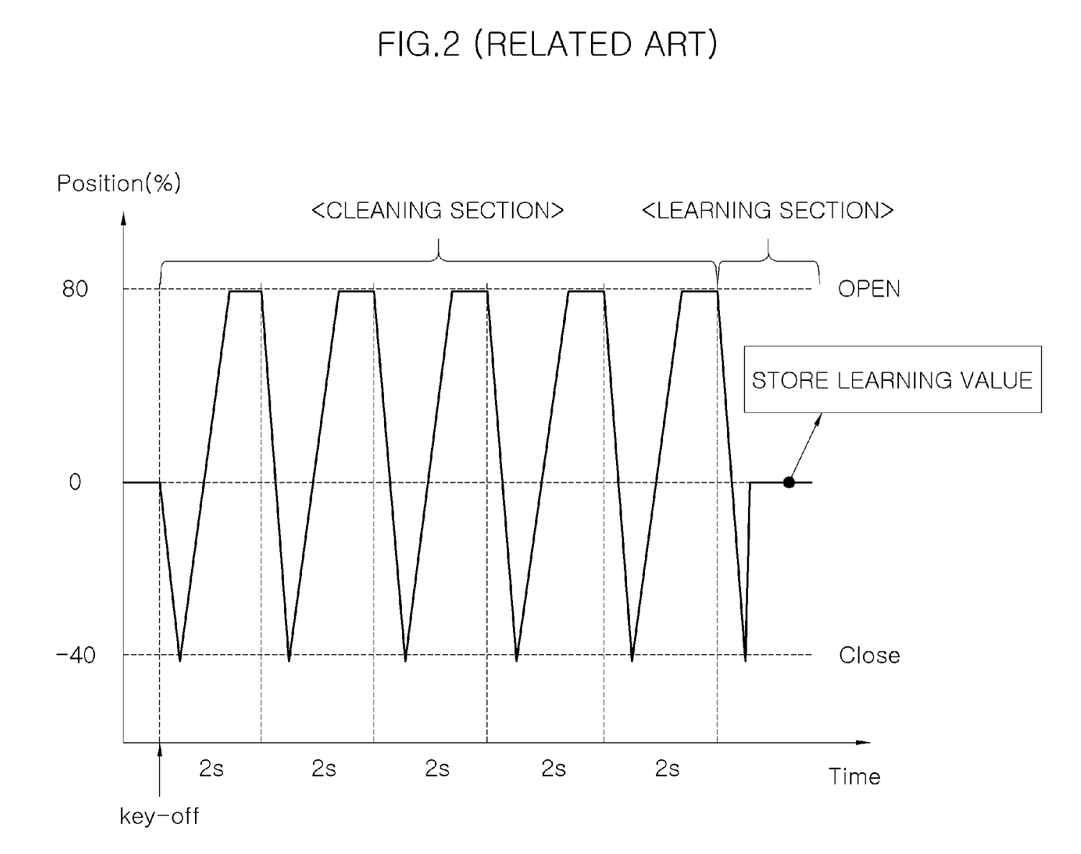

To prevent this, as illustrated in FIG. 2 (RELATED ART), the vehicle to which the existing diesel engine is applied forcibly opens and closes repeatedly the EGR valve whenever the engine stops and then recognizes a pressed amount of the valve in a state in which the valve is closed, thereby continuously monitoring and learning the soot deposition of the inflow passage of the EGR valve and an area of the inflow passage of the EGR valve accordingly. That is, the mapping value of the control map controlling the opening and closing of the EGR value is changed in response to the area of the inflow passage of the EGR valve that is narrow due to the soot deposition.

Further, a swirl control valve (SCV) serves to quicken a flow of air in a combustion chamber of the diesel vehicle. That is, the SCV is a valve that is installed in a suction hole and changes a direction of the valve to change an intake port to a swirl port or uses a general intake port to improve power and a fuel consumption rate.

To reduce an ignition delay of the diesel engine, there is a need to increase an intake flow rate and a flame speed. If the intake flow rate in the combustion chamber is quick, a mixture of air and fuel is good and the flame speed is also quick. Therefore, if the uniform mixture is made quickly, the generation of particulate matter (PM) is reduced. However, the general diesel engine has problems in that an up-and-down motion of a piston is slow during low-speed driving, and therefore the intake flow rate is slow and it is difficult to perform the smooth mixture.

To solve the above problems, the existing diesel engine has two small intake ports and uses the SCV to operate the engine in the state in which one intake port is closed. For example, the SCV is closed to quickly perform the mixture in an idle state/a middle-low load region (3000 rpm or less) where the flow rate is slow, and the SCV is open in a high load region (3000 rpm or more) to increase the engine power in response to an increase in charging efficiency and a reduction in pumping loss.

Further, an air control valve (ACV) serves to reduce vibration of the diesel engine upon a key-off. For example, the diesel engine is operated by inertia even after the key-off. In this case, the fuel that is injected into the engine in advance is combusted by the operation of the engine as described above. As described above, vibration occurs by the combustion of the engine that occurs after the key-off. To prevent this problem, there is a need to cut off the intake temporarily supplied to the engine upon the key-off. The valve performing this role is the air control valve (ACV).

However, various kinds of incomplete combustion materials that are included in the exhaust gas are sucked into an intake manifold through the EGR. In this case, some of oil mist is stuck to the inflow passage of the SCV and the ACV, and therefore the inflow passage is continuously narrow. Therefore, upon mapping the control map determining whether to open and close the SCV and the ACV, an emission is likely to exceed a reference value.

Figure 3:
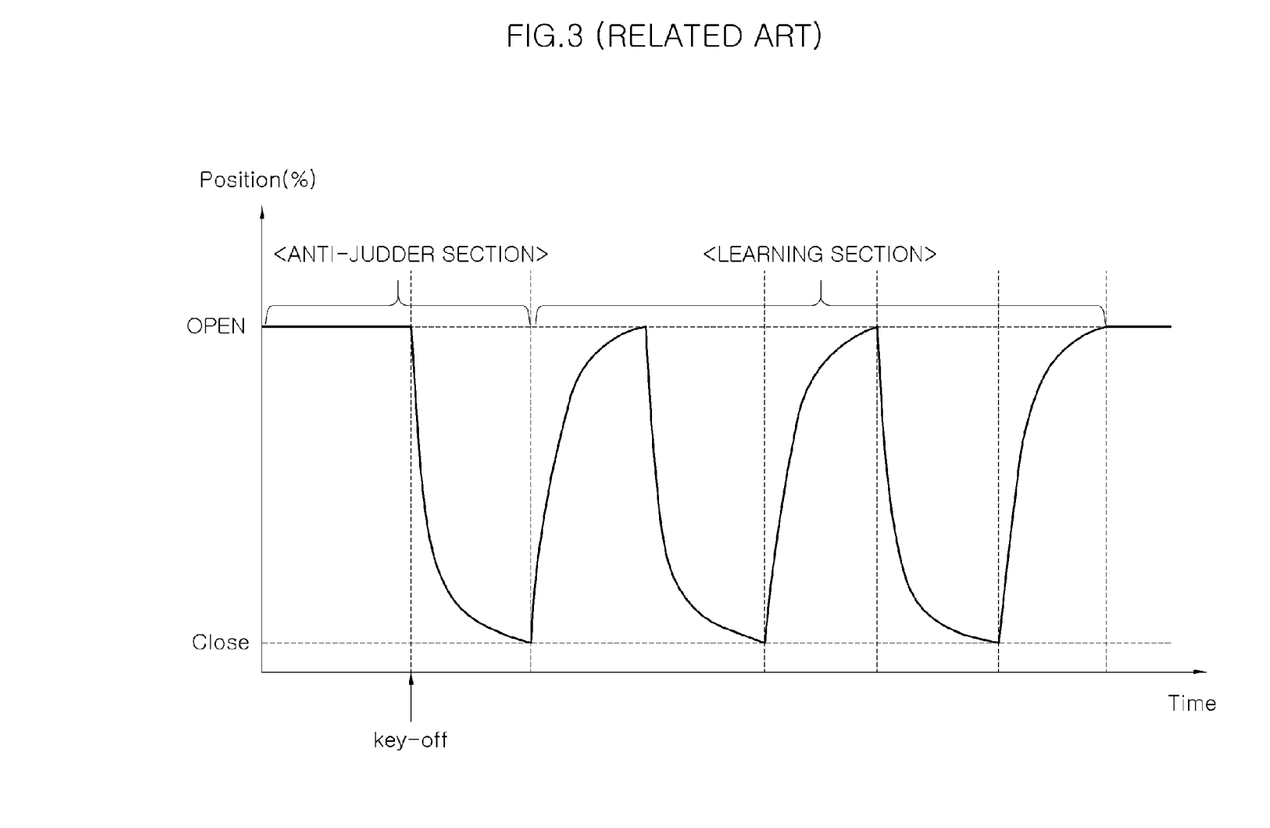

To prevent this problem, as illustrated in FIG. 3 (RELATED ART), the vehicle to which the existing diesel engine is applied forcibly opens and closes repeatedly the SCV and the ACV whenever the engine stops and then recognizes the pressed amount of the valve in the state in which the valve is closed, thereby continuously monitoring and learning the impurity deposition of the inflow passage of the SCV and the ACV and the area of the inflow passage of the SCV and the ACV accordingly. That is, the mapping value of the control map controlling the opening and closing of the SCV and the ACV is changed in response to the area of the inflow passage of the SCV and the ACV that is narrow due to the impurity deposition.

Figure 1:
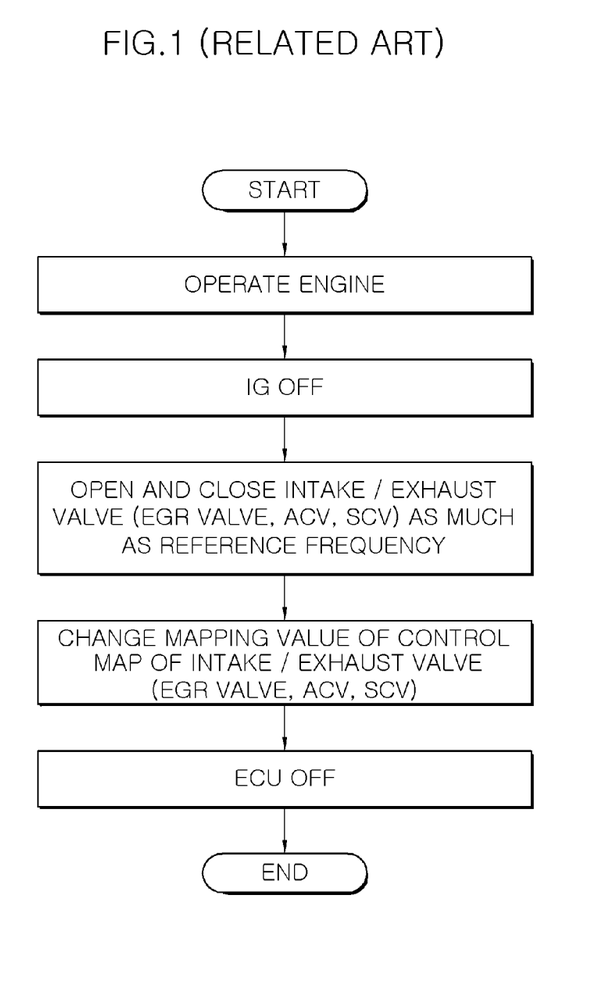
FIGS. 1 to 3 (RELATED ART) are diagrams for describing a problem of the related art.

As described above, the intake/exhaust valves (EGR valve, SCV, ACV, etc.) of the vehicle to which the existing diesel engine is applied learn the changed area of the inflow passage whenever the key-off is made. That is, the mapping value of the control map is changed in response to the changed area of the inflow passage. Further, before the area of the inflow passage is changed, the intake/exhaust valves (EGR valve, SCV, ACV, etc.) are opened and closed several times to tramp the impurities and then perform the learning, thereby minimizing the error of the changed area of the inflow passage (see, e.g., FIG. 1 (RELATED ART)).

However, unnecessary noise occurs during the learning and the opening and closing before the learning, such that vehicle occupants may experience discomfort, and the marketability of the vehicle may be reduced.

SUMMARY

An embodiment of the present invention is directed to a learning method for controlling an opening or a closing of an intake/exhaust valve of a vehicle and a learning apparatus for the same capable of learning a change in an area of an inflow passage of the intake/exhaust valve during operation of an engine and reducing an opening and closing frequency of the intake/exhaust valve before the learning.

Other objects and advantages of the present invention can be understood by the following description, and become apparent with reference to the embodiments of the present invention.

An embodiment of the present invention provides a learning method for controlling an opening or a closing of an intake/exhaust valve of a vehicle including: a state determining step determining, by a controller, whether a vehicle state satisfies a learning entry condition; a learning frequency determining step determining, by the controller, whether a learning frequency is less than a preset reference frequency after the vehicle starts, when the vehicle state satisfies the learning entry condition; a change learning step learning, by the controller, an area of an inflow passage of the intake/exhaust valve that is changed due to a deposition of impurities, when the learning frequency while driving is less than the preset reference frequency after the vehicle starts; and an escape condition determining step determining, by the controller, whether the vehicle state satisfies a learning escape condition, after the learning step.

The state determining step may include a first state determining step determining whether an engine is operated; a second state determining step determining whether a current vehicle speed exceeds a preset reference vehicle speed, when the engine is being operated; and a third state determining step determining whether the vehicle is coasting, when the current vehicle speed exceeds the preset reference vehicle speed.

In the third state determining step, it may be determined whether the vehicle is coasting, when an open value of an accelerator pedal is 0 and fuel is not injected into the engine.

The change learning step may include a driving pattern analyzing step forming a table consisting of a driving cycle of the vehicle and a ratio of the vehicle speed upon one-time driving of the vehicle.

The change learning step may include a driving inclination deriving step deriving a driving inclination depending on whether to satisfy a preset Equation using a table, after the driving pattern analyzing step.

In the driving inclination deriving step, the driving inclination may be derived as a low-speed inclination X when a value of the Table satisfies the following Equation.

$$\frac{a_1 + a_2 + \cdots + a_n}{n} > 50\%$$

In the driving inclination deriving step, the driving inclination may be derived as a first middle-low-speed inclination Y1 when a value of the table satisfies the following Equation.

$$\frac{a_1 + a_2 + \cdots + a_n}{n} + \frac{b_1 + b_2 + \cdots + b_n}{n} > 90\%$$

In the driving inclination deriving step, the driving inclination may be derived as a second middle-low-speed inclination Y2 when a value of the table satisfies the following Equation.

$$\frac{a_1 + a_2 + \cdots + a_n}{n} + \frac{b_1 + b_2 + \cdots + b_n}{n} < 70\%$$

In the driving inclination deriving step, the driving inclination may be derived as a high-speed inclination Z when a value of the table satisfies the following Equation.

$$\frac{b_1 + b_2 + \cdots + b_n}{n} + \frac{c_1 + c_2 + \cdots + c_n}{n} > 80\%$$

The change learning step may include a driving inclination determining step determining whether the driving inclination derived in the driving inclination deriving step is a low-speed inclination X or a first middle-low-speed inclination Y1.

The change learning step may include a first opening and closing step opening and closing the intake/exhaust valve as much as a preset first reference frequency A when the driving inclination derived in the driving inclination deriving step is the low-speed inclination X or the first middle-low-speed inclination Y1.

The change learning step may include a first learning step changing a mapping value of a control map of the intake/exhaust valve, on the basis of an area of an inflow passage of the intake/exhaust valve after the first opening and closing step.

The change learning step may include a second opening and closing step opening and closing the intake/exhaust valve as much as a preset second reference frequency B when the driving inclination derived in the driving inclination deriving step is not the low-speed inclination X or the first middle-low-speed inclination Y1 and the preset second reference frequency B may be smaller than the preset first reference frequency A.

The change learning step may include a second learning step changing a mapping value of a control map of the intake/exhaust valve, on the basis of an area of an inflow passage of the intake/exhaust valve after the second opening and closing step.

The learning escape condition of the escape condition determining step may be a condition that an open value of an accelerator pedal exceeds a preset reference open value or a fuel injection from an engine is resumed A storage medium according to the present invention stores the learning method for controlling opening or closing of an intake/exhaust valve of a vehicle.

Another embodiment of the present invention provides a learning apparatus for controlling opening or closing of an intake/exhaust valve of a vehicle, including: a storage medium in which a learning method for controlling opening or closing of an intake/exhaust valve of a vehicle is stored; a sensing unit configured to sense whether an engine is operated, a current vehicle speed and whether an accelerator pedal and a brake pedal are operated; an intake/exhaust valve configured to control an inhalation or a displacement volume of the vehicle; and a controlling and learning unit configured to control whether the intake/exhaust valve is opened and closed and the opening and closing frequency depending on the learning method for controlling opening or closing of an intake/exhaust valve of a vehicle stored in the storage medium and change a mapping value controlling the intake/exhaust valve depending on a change in a passing flux of the intake/exhaust valve, by using whether the engine is operated, the current vehicle speed, and whether the accelerator pedal and the brake pedal are operated that are sensed by the sensing unit.

The sensing unit may include: an engine state sensor configured to sense whether the engine is operated and fuel is injected; a vehicle speed sensor configured to sense a vehicle speed; an accelerator pedal position sensor (APS) configured to sense whether an accelerator pedal is operated; and a brake pedal position sensor (BPS) configured to sense whether a brake pedal is operated.

The intake/exhaust valve includes at least one of an exhaust gas recirculation valve (EGR valve) configured to control the amount of exhaust gas re-circulated to an intake side among exhaust gases emitted from the engine; an air control valve (ACV) configured to cut off an inhalation from being introduced into the engine after a key-off; and a swirl control valve (SCV) configured to be mounted in an intake port of the engine to accelerate the flow of air within a combustion chamber.

DESCRIPTION OF SPECIFIC EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 4A:
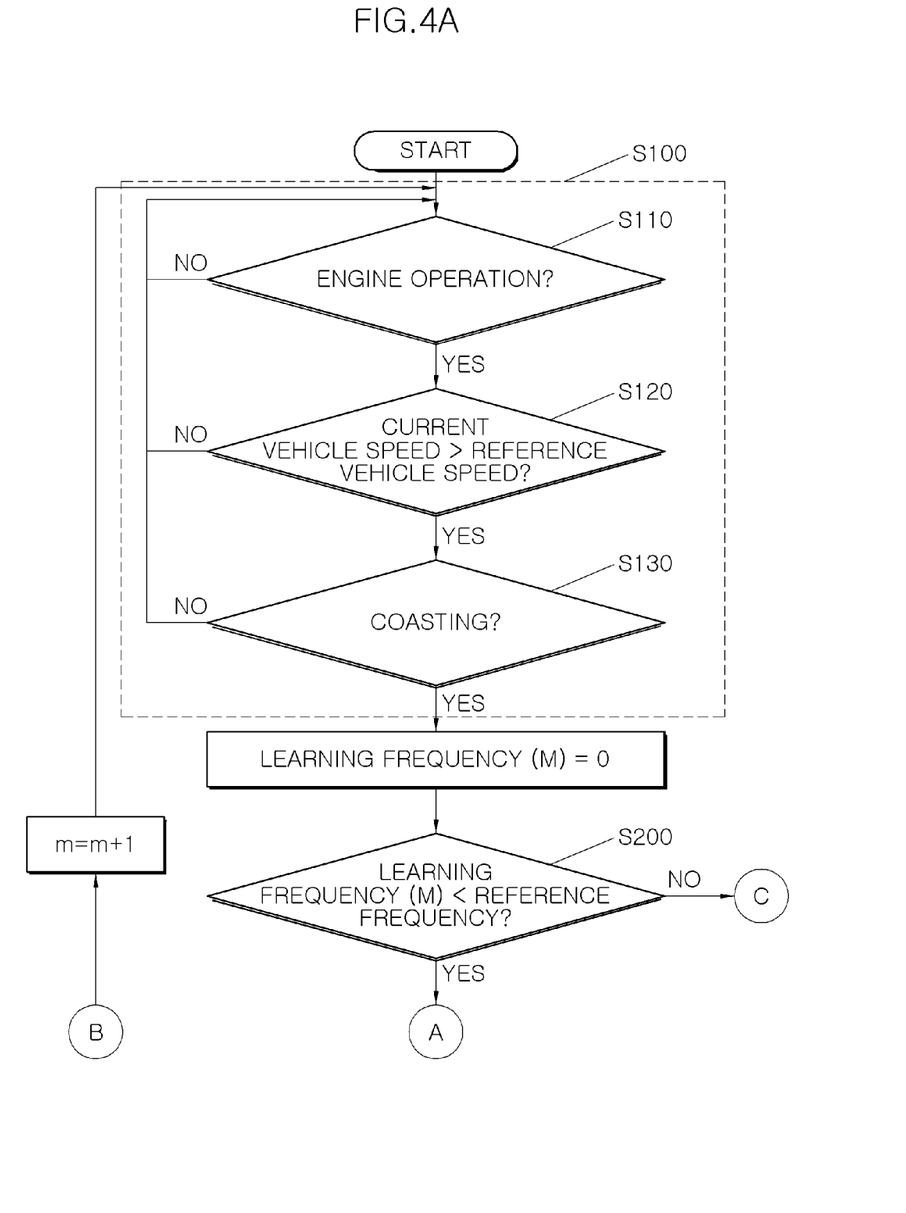
FIGS. 4A-4B depict a flow chart of a learning method for controlling opening or closing of an intake/exhaust valve of a vehicle according to an exemplary embodiment of the present invention.
Figure 4B:
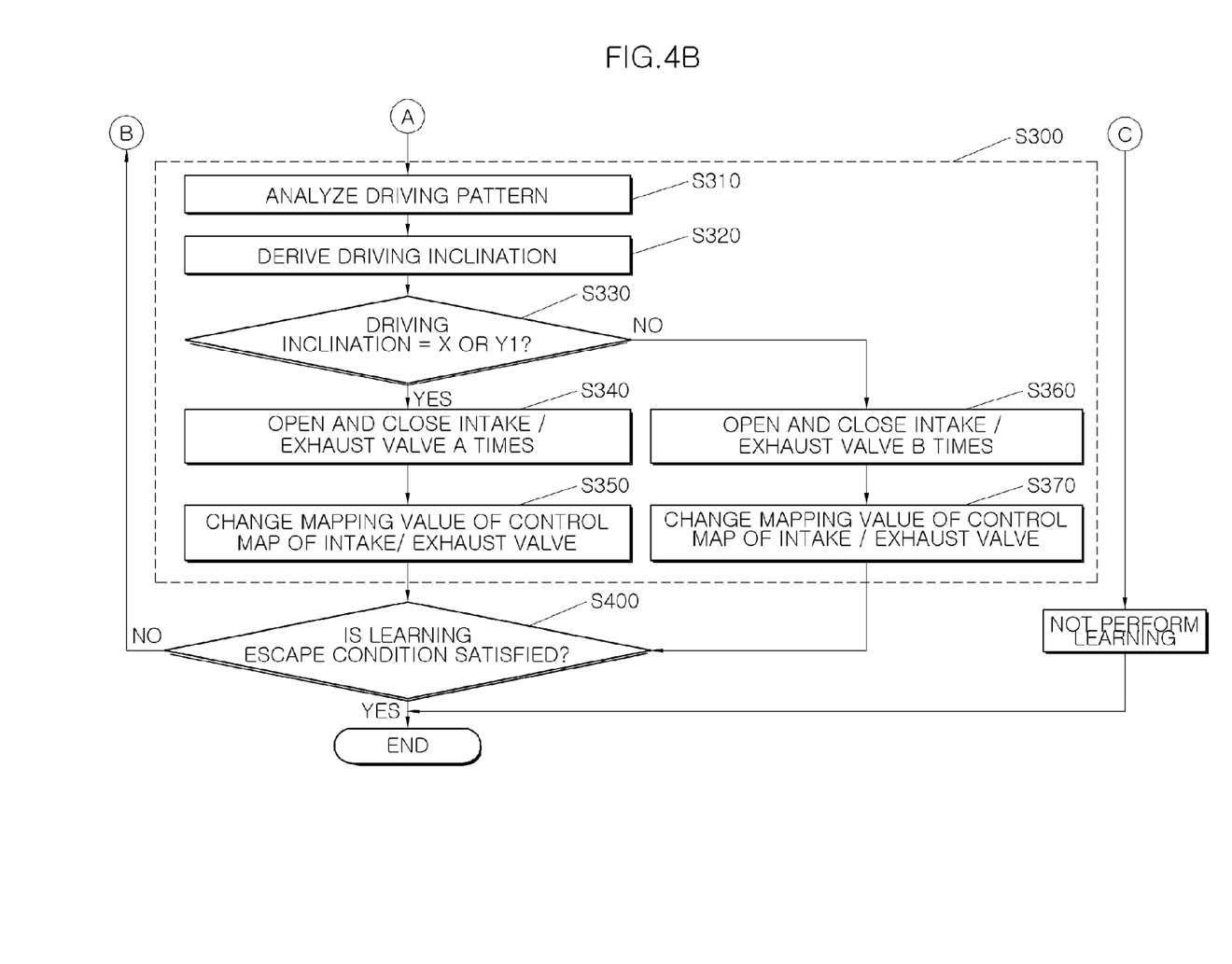
Figure 5:
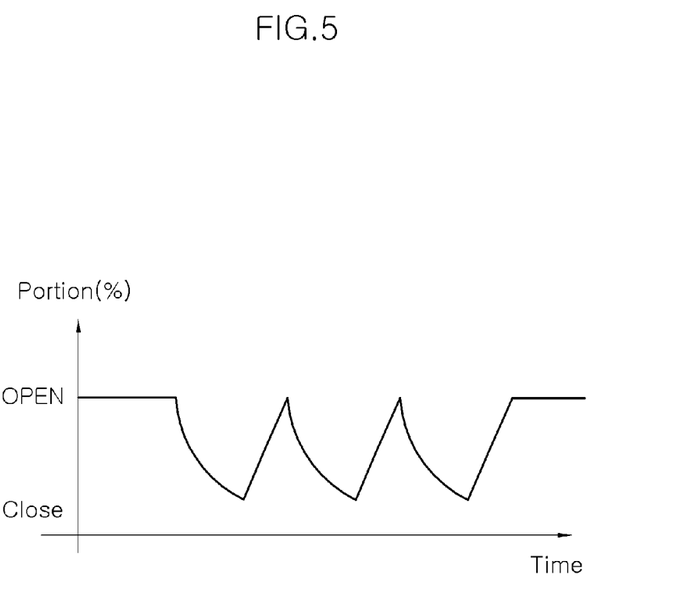
FIGS. 5 and 6 are diagrams for describing opening and closing of an intake/exhaust valve in the learning method for controlling opening or closing of an intake/exhaust valve of a vehicle according to an exemplary embodiment of the present invention.
Figure 6:
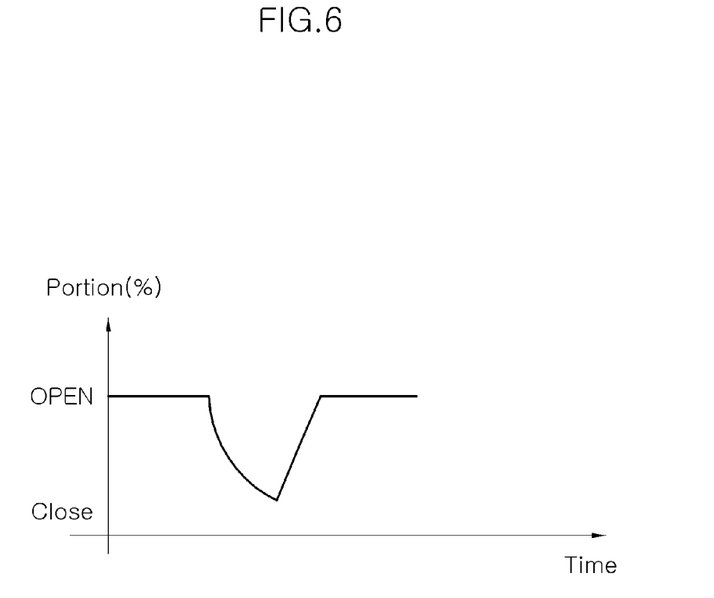

FIGS. 4A-4B depict a flow chart of a learning method for controlling opening or closing of an intake/exhaust valve of a vehicle according to an exemplary embodiment of the present invention, and FIGS. 5 and 6 are diagrams for describing an opening and closing of an intake/exhaust valve in the learning method for controlling opening or closing of an intake/exhaust valve of a vehicle according to an exemplary embodiment of the present invention. Referring to FIGS. 4A-4B to 5, the learning method for controlling opening or closing of an intake/exhaust valve of a vehicle according to the exemplary embodiment of the present invention includes a state determining step (S100), a learning frequency determining step (S200), a change learning step (S300), and an escape condition determining step (S400). The above steps and sub-steps thereof preferably are carried out by a controller, e.g., a control and learning unit 400 depicted in FIG. 7.

In the state determining step (S100), it is determined whether a vehicle state (in particular, a state of a diesel vehicle) satisfies a learning entry condition. The state determining step (S100) includes a first state determining step (S110), a second state determining step (S120), and a third state determining step (S130).

In the first state determining step (S110), it is determined whether the engine (in particular, diesel engine) is being operated. An object of the present invention is to prevent noise due to learning after a key-off. To this end, the learning is performed while the engine is being operated. For this purpose, it is determined whether the engine is being operated.

In the second state determining step (S120), it is determined whether a current vehicle speed exceeds a preset reference vehicle speed, when the engine is being operated. This is to prevent the learning from being performed in a section (e.g., driving around a city or low-speed section) where a vehicle is changed to general driving as soon as it enters coasting. That is, it takes much time to perform the learning during the operation of the engine, and therefore the learning may not be completed in the driving around a city or the low-speed section. The preset reference vehicle speed may be set to be 50 km/hr, but is not necessarily limited thereto. Therefore, the preset reference vehicle speed may be set differently depending on a kind of vehicles, a designer's intention, or the like.

In the third state determining step (S130), when the current vehicle speed exceeds the preset reference vehicle speed, it is determined whether the vehicle is coasting. In this case, when an open value of an accelerator pedal is 0 and fuel is not injected into the engine, it is determined whether the vehicle is coasting. The coasting is a state in which the accelerator pedal is not operated and there is no fuel injection from the engine. That is, the coasting is a state in which the vehicle is driving only by inertia (in this case, it is preconditioned that a brake pedal is not also operated). That is, since there is no fuel injection, the combustion does not occur in the engine.

Therefore, even though the intake/exhaust valves (exhaust gas recirculation (EGR) valve, swirl control valve (SCV), air control valve (ACV), etc.) are closed for learning, the vehicle has no difficulty in driving. Therefore, to perform the learning only when the vehicle is coasting, in the third state determining step (S130), it is determined whether the vehicle is coasting.

In the learning frequency determining step (S200), when the vehicle state satisfies the learning entry condition, it is determined whether a learning frequency m is less than a preset reference frequency after the vehicle starts. That is, when the coasting is frequent while one-time driving (one driving cycle, that is, section from a key-on to a key-off), there is a problem in that when the learning is progressed whenever the coasting is made, durability of the intake/exhaust valves (EGR valve, SCV, ACV, etc.) and the relevant components is aggravated. To prevent the problem, the learning frequency m while one-time driving is limited to the preset reference frequency. The preset reference frequency may be set to be three times, but is not necessarily limited thereto. Therefore, the preset reference frequency may be set differently depending on a designer's intention.

In the change learning step (S300), when the learning frequency m while driving is less than the preset reference frequency after the vehicle starts, an area of an inflow passage of the intake/exhaust valve that is changed due to a deposition of impurities is learned. That is, various kinds of incomplete combustion materials that are included in the exhaust gas while the vehicle is driving are sucked into an intake manifold through the EGR. In this case, a portion of an inflow passage of the EGR valve is sooted and some of oil mist is stuck to the inflow passage of the SCV and the ACV, such that the inflow passage may continuously narrow.

Therefore, the inflow passage of the EGR valve is continuously narrow and the amount of re-circulated exhaust gas is reduced. Further, upon mapping the control map determining whether to open and close the SCV and the ACV, an emission is likely to exceed a reference value.

Therefore, to solve the above problem, the area of the inflow passage of the intake/exhaust valve that is changed due to the deposition of impurities at each coasting section while one-time driving (one driving cycle, that is, section from the key-on to the key-off) is learned. (However, as described above, the learning frequency is limited to the preset frequency)

The change learning step (S300) includes a driving pattern analyzing step (S310), a driving inclination deriving step (S320), a driving inclination determining step (S330), a first opening step (S340), a first learning step (S350), a second opening step (S360), and a second learning step (S370).

In the driving pattern analyzing step (S310), a table consisting of a driving cycle of the vehicle and a ratio of the vehicle speed upon the one-time driving of the vehicle is formed. The table may be formed as the following Table 1.

TABLE 1

| Driving Cycle (Times) | Ratio of vehicle speed at each section depending on driving cycle (%) | | |
|---|---|---|---|
| 1 | a__1 | b__1 | c__1 |
| 2 | a__2 | b__2 | c__2 |
| 3 | a__3 | b__3 | c__3 |
| ... | ... | ... | ... |
| n | a__n | b__n | c__n |

Hereinafter, Table 1 will be described in detail.

The a_n and the b_n are differentiated based on a first reference speed v_1 and the b_n and the c_n are differentiated based on a second reference speed v_2. The first reference speed v_1 and the second reference speed v_2 may be set differently depending on the designer's intention, etc.

For example, the first reference speed v_1 may be set to be 50 km/hr and the second reference speed v_2 may be set to be 100 km/hr. In this case, when a ratio where the vehicle is driving less than 50 km/hr is 33.3%, a ratio where the vehicle is driving at 50 km/hr or less and less than 100 km/hr is 33.3%, a ratio where the vehicle is driving at 100 km/hr or more is 33.3%, a_1=33.3, b_1=33.3, and c_1=33.3. As the driving cycle of the vehicle is increased, data of a vertical axis of the above Table 1 is increased, such that the driving pattern of the vehicle may be analyzed more precisely.

In the driving inclination deriving step (S320), after the driving pattern analyzing step (S310), the driving inclination depending on whether to satisfy the preset Equation using the Table 1 is derived. In the driving inclination deriving step (S320), the driving inclination is derived as a low-speed inclination X when the value of the above Table 1 satisfies the following Equation 1.

$$\frac{a_1 + a_2 + \cdots + a_n}{n} > 50\% \quad \text{[Equation 1]}$$

Further, in the driving inclination deriving step (S320), the driving inclination is derived as a first middle-low-speed inclination Y1 when the value of the above Table 1 satisfies the following Equation 2.

$$\frac{a_1 + a_2 + \cdots + a_n}{n} + \frac{b_1 + b_2 + \cdots + b_n}{n} > 90\% \quad \text{[Equation 2]}$$

Further, in the driving inclination deriving step (S320), the driving inclination is derived as a second middle-low-speed inclination Y2 when the value of the above Table 1 satisfies the following Equation 3.

$$\frac{a_1 + a_2 + \cdots + a_n}{n} + \frac{b_1 + b_2 + \cdots + b_n}{n} < 70\% \quad \text{[Equation 3]}$$

Further, in the driving inclination deriving step (S320), the driving inclination is derived as a high-speed inclination Z when the value of the above Table 1 satisfies the following Equation 4.

$$\frac{b_1 + b_2 + \cdots + b_n}{n} + \frac{c_1 + c_2 + \cdots + c_n}{n} > 80\% \quad \text{[Equation 4]}$$

Hereinafter, the driving inclination driving step S320 will be described by way of example.

For example, as described above, it is assumed that a_1=33.3, b_1=33.3, and c_1=33.3 in one-time driving cycle. In this case, depending on the above Equation 1, 33.3/1=33.3, and therefore the above Equation 1 is not satisfied. Further, depending on the above Equation 2, 33.3/1+33.3/1=66.6, and therefore the above Equation 2 is not satisfied as well. Further, depending on the above Equation 4, 33.3/1+33.3/1=66.6, and therefore the above Equation 4 is not satisfied as well.

However, depending on the above Equation 3, 33.3/1+ 33.3/1=66.6, and therefore the above Equation 3 is satisfied. Therefore, it may be determined that the driver of the driving pattern depending on the above example is a driver of the second middle-low-speed inclination Y2.

In the driving inclination determining step (S330), it is determined that the driving inclination derived in the driving inclination deriving step (S320) is the low-speed inclination X or the first middle-low-speed inclination Y1. The reason is that the amount of impurities (soot, etc.) deposited in the intake/exhaust valve varies depending on whether the driving inclination of the driver is the low-speed inclination X or the first middle-low-speed inclination Y1 or the second middle-low-speed inclination Y2 or the high-speed inclination Z. That is, the frequency to open and close the intake/exhaust valve before learning the area of the inflow passage of the intake/exhaust valve may vary depending on the amount of impurities (soot, etc.) deposited in the intake/exhaust valve. Therefore, it is possible to reduce the noise depending on the opening and closing of the intake/exhaust valve. For this purpose, first of all, the driving inclination of the driver needs to be determined.

In the first opening step (S340), when the driving inclination derived in the driving inclination deriving step (S320) is the low-speed inclination X or the first middle-low-speed inclination Y1, the intake/exhaust valve is opened and closed as much as a first reference frequency A and in the first learning step (S350), the mapping value of the control map of the intake/exhaust valve is changed on the basis of the area of the inflow passage of the intake/exhaust valve after the first opening and closing step (S340).

Further, in the second opening step (S360), when the driving inclination derived in the driving inclination deriving step (S320) is not the low-speed inclination X or the first middle-low-speed inclination Y1, the intake/exhaust valve is opened and closed as much as a second reference frequency B and in the second learning step (S370), the mapping value of the control map of the intake/exhaust valve is changed on the basis of the area of the inflow passage of the intake/exhaust valve after the second opening and closing step (S360).

In this case, the preset second reference frequency B is preferably set to be a frequency smaller than the preset first reference frequency A. The preset first reference frequency A and the preset second reference frequency B may be differently set depending on the designer's intention, etc. For example, the preset first reference frequency A may be set to be three times (see FIG. 5) and the preset second reference frequency B may also be set to be one time (see FIG. 6).

That is, due to the incomplete combustion in the low-speed driving section, a large amount of impurities (soot, etc.) are included in the exhaust gas emitted after an explosion stroke of the engine. Therefore, if the impurities (soot, etc.) are introduced into the intake side of the engine by the EGR, a large amount of impurities are deposited at the portion of the inflow passage of the intake/exhaust valves (EGR valve, ACV, SCV). Therefore, in the first opening/closing step (S340), the intake/exhaust valves (EGR valve, ACV, SCV) are opened and closed as much as the first reference frequency A to remove or trap the impurities (soot, etc.) and then the mapping value of the control map of the intake/exhaust valve is changed on the basis of the area of the inflow passage of the intake/exhaust valve.

Further, since the amount of incomplete combustion materials is small in the high-speed driving section, a small amount of impurities (soot, etc.) are included in the exhaust gas emitted after the explosion stroke of the engine. Further, the occurring impurities (soot, etc.) are smoothly emitted through an outlet. Therefore, since the impurities are introduced into the intake side of the engine by the EGR and thus the amount of impurities (soot, etc.) deposited in the portion of the inflow passage of the intake/exhaust valves (EGR valve, ACV, SCV) is small, in the second opening and closing step (S360), it is enough to open and close the intake/exhaust valve as much as the preset second reference frequency B. Next, in the second learning step (S370), the mapping value of the control map of the intake/exhaust valve is changed on the basis of the area of the inflow passage of the intake/exhaust valve.

In the escape condition determining step (S400), after the learning step (S300), it is determined whether the vehicle state satisfies the learning escape condition. The learning escape condition of the escape condition determining step (S400) may be a condition that the open value of the accelerator pedal exceeds a preset reference open value or the fuel injection from the engine is resumed. The reason is that when the coasting ends, that is, when the driver steps on the accelerator pedal to resume the fuel injection from the engine, the learning during the coasting may be immediately stopped and the vehicle may be smoothly driven. Otherwise, the problem of the reduction in the marketability of the vehicle, etc., may occur due to the responsiveness delay of the vehicle. Accordingly, the condition is required to prevent the problem in advance.

Figure 7:
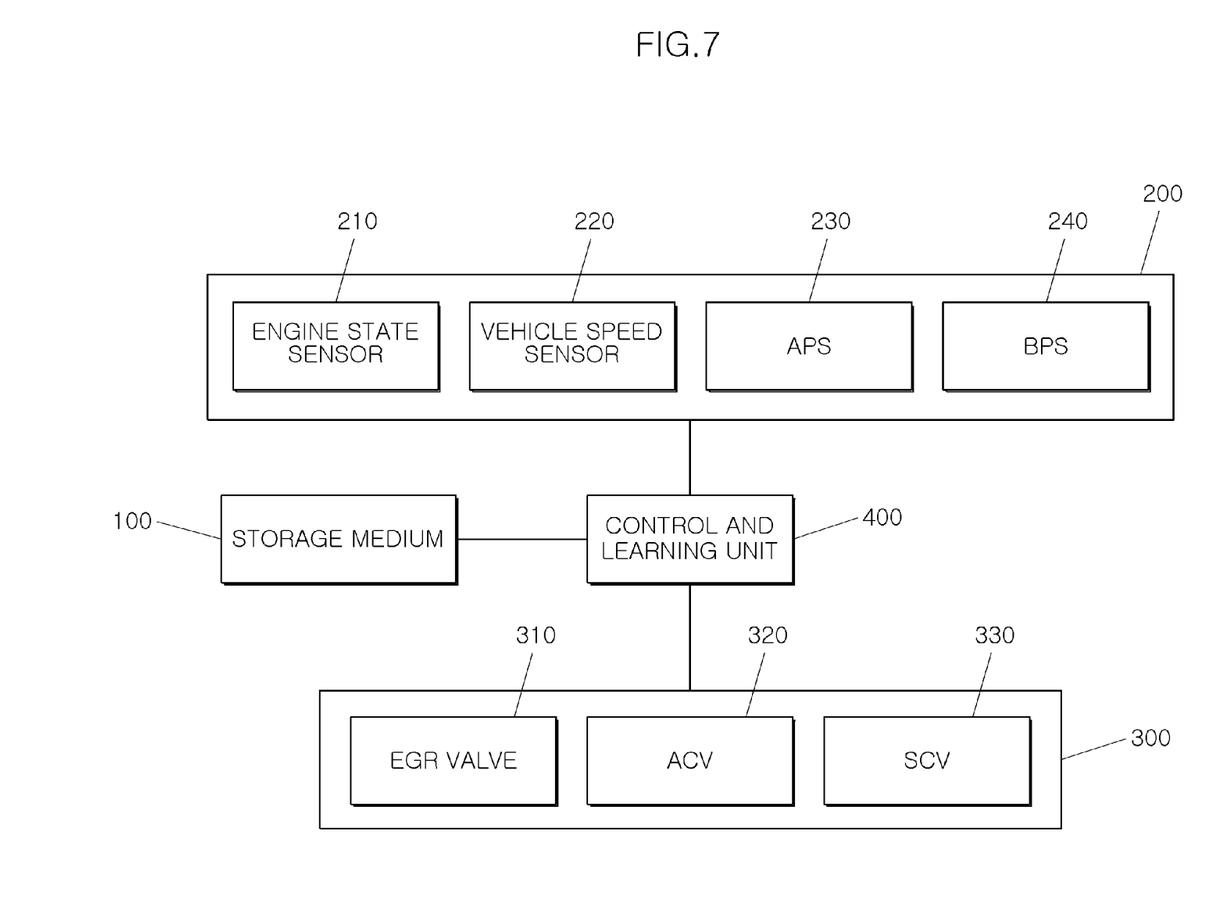
FIG. 7 is a block diagram of a learning apparatus of an intake/exhaust valve of a vehicle according to an exemplary embodiment of the present invention.

FIG. 7 is a block diagram of a learning apparatus of an intake/exhaust valve of a vehicle according to an exemplary embodiment of the present invention. Referring to FIG. 7, a learning apparatus for controlling opening or closing of an intake/exhaust valve of a vehicle according to an exemplary embodiment of the present invention includes a storage medium 100 in which the learning method for controlling opening or closing of an intake/exhaust valve of a vehicle is stored; a sensing unit 200 configured to sense whether the engine is operated, a current vehicle speed and whether an accelerator pedal and a brake pedal are operated; an intake/exhaust valve 300 configured to control an inhalation or a displacement volume of the vehicle; and a controlling and learning unit 400 (i.e., the controller) configured to control whether the intake/exhaust valve 300 is opened and closed and the opening and closing frequency depending on the learning method for controlling opening or closing of an intake/exhaust valve of a vehicle stored in the storage medium 100 and change the mapping value controlling the intake/exhaust valve 300 depending on a change in passing flux of the intake/exhaust valve 300, by using whether the engine is operated, the current vehicle speed, and whether the accelerator pedal and the brake pedal are operated that are sensed by the sensing unit 200.

The sensing unit 200 includes an engine state sensor 210 configured to sense whether the engine is operated and the fuel is injected; a vehicle speed sensor 220 configured to sense a vehicle speed; an accelerator pedal position sensor (APS) 230 configured to sense whether the accelerator pedal is operated; and a brake pedal position sensor (BPS) 240 configured to sense whether the brake pedal is operated.

The intake/exhaust valve 300 includes at least one of an exhaust gas recirculation valve (EGR valve) 310 configured to control the amount of exhaust gas re-circulated to the intake side among the exhaust gases emitted from the engine; an air control valve (ACV) 320 configured to cut off an inhalation from being introduced into the engine after the key-off; and a swirl control valve (SCV) 330 configured to be mounted in the intake port of the engine to accelerate the flow of air within the combustion chamber.

As described above, according to the exemplary embodiments of the present invention, it is possible to prevent discomfort of vehicle occupants and the reduction in the marketability of the vehicle due to the noise occurring upon the learning by learning the change in the area of the inflow passage of the intake/exhaust valve during the operation of the engine and reducing the opening and closing frequency of the intake/exhaust valve before the learning.

The foregoing exemplary embodiments are only examples to allow a person having ordinary skill in the art to which the present invention pertains (hereinafter, referred to as those skilled in the art) to easily practice the present invention. Accordingly, the present invention is not limited to the foregoing exemplary embodiments and the accompanying drawings, and therefore, a scope of the present invention is not limited to the foregoing exemplary embodiments. Accordingly, it will be apparent to those skilled in the art that substitutions, modifications and variations can be made without departing from the spirit and scope of the invention as defined by the appended claims and can also belong to the scope of the invention.

What is claimed is:

1. A learning method for controlling opening or closing of an intake/exhaust valve of a vehicle, comprising:
   a state determining step determining, by a controller, whether a vehicle state satisfies a learning entry condition;
   a learning frequency determining step determining, by the controller, whether a learning frequency is less than a preset reference frequency after the vehicle starts, when the vehicle state satisfies the learning entry condition;
   a change learning step learning, by the controller, an area of an inflow passage of the intake/exhaust valve that is changed due to a deposition of impurities, when the learning frequency while driving is less than the preset reference frequency after the vehicle starts; and
   an escape condition determining step determining, by the controller, whether the vehicle state satisfies a learning escape condition, after the learning step.

2. The learning method of claim 1, wherein the state determining step includes a first state determining step determining, by the controller, whether an engine is operated.

3. The learning method of claim 2, wherein the state determining step includes a second state determining step determining, by the controller, whether a current vehicle speed exceeds a preset reference vehicle speed, when the engine is being operated.

4. The learning method of claim 3, wherein the state determining step includes a third state determining step (S130) determining, by the controller, whether the vehicle is coasting, when the current vehicle speed exceeds the preset reference vehicle speed.

5. The learning method of claim 4, wherein in the third state determining step, it is determined whether the vehicle is coasting, when an open value of an accelerator pedal is 0 and fuel is not injected into the engine.

6. The learning method of claim 1, wherein the change learning step includes a driving pattern analyzing step forming, by the controller, a table consisting of a driving cycle of the vehicle and a ratio of the vehicle speed upon one-time driving of the vehicle.

7. The learning method of claim 6, wherein the change learning step includes a driving inclination deriving step deriving, by the controller, a driving inclination depending on whether to satisfy a preset Equation using a table, after the driving pattern analyzing step.

8. The learning method of claim 7, wherein in the driving inclination deriving step, the driving inclination is derived as a low-speed inclination X when a value of the Table satisfies the following Equation.

$$\frac{a_1 + a_2 + \cdots + a_n}{n} > 50\%.$$

9. The learning method of claim 7, wherein in the driving inclination deriving step, the driving inclination is derived as a first middle-low-speed inclination Y1 when a value of the table satisfies the following Equation.

$$\frac{a_1 + a_2 + \cdots + a_n}{n} + \frac{b_1 + b_2 + \cdots + b_n}{n} > 90\%.$$

10. The learning method of claim 7, wherein in the driving inclination deriving step, the driving inclination is derived as a second middle-low-speed inclination Y2 when a value of the table satisfies the following Equation.

$$\frac{a_1 + a_2 + \cdots + a_n}{n} + \frac{b_1 + b_2 + \cdots + b_n}{n} < 70\%.$$

11. The learning method of claim 7, wherein in the driving inclination deriving step, the driving inclination is derived as a high-speed inclination Z when a value of the table satisfies the following Equation.

$$\frac{b_1 + b_2 + \cdots + b_n}{n} + \frac{c_1 + c_2 + \cdots + c_n}{n} > 80\%.$$

12. The learning method of claim 7, wherein the change learning step includes a driving inclination determining step determining, by the controller, whether the driving inclination derived in the driving inclination deriving step is a low-speed inclination X or a first middle-low-speed inclination Y1.

13. The learning method of claim 12, wherein the change learning step includes a first opening and closing step opening and closing the intake/exhaust valve as much as a preset first reference frequency A when the driving inclination derived in the driving inclination deriving step is the low-speed inclination X or the first middle-low-speed inclination Y1.

14. The learning method of claim 13, wherein the change learning step includes a first learning step changing a mapping value of a control map of the intake/exhaust valve, on the basis of an area of an inflow passage of the intake/exhaust valve after the first opening and closing step.

15. The learning method of claim 12, wherein the change learning step includes a second opening and closing step opening and closing, by the controller, the intake/exhaust valve as much as a preset second reference frequency B when the driving inclination derived in the driving inclination deriving step is not the low-speed inclination X or the first middle-low-speed inclination Y1, and the preset second reference frequency B is smaller than the preset first reference frequency A.

16. The learning method of claim 15, wherein the change learning step includes a second learning step changing, by the controller, a mapping value of a control map of the intake/exhaust valve, on the basis of an area of an inflow passage of the intake/exhaust valve after the second opening and closing step.

17. The learning method of claim 1, wherein the learning escape condition of the escape condition determining step is a condition that an open value of an accelerator pedal exceeds a preset reference open value or a fuel injection from an engine is resumed.

18. A learning apparatus for controlling opening or closing of an intake/exhaust valve of a vehicle, comprising:
a storage medium in which a learning method for controlling opening or closing of an intake/exhaust valve of a vehicle is stored;
a sensing unit configured to sense whether an engine is operated, a current vehicle speed and whether an accelerator pedal and a brake pedal are operated;
an intake/exhaust valve configured to control an inhalation or a displacement volume of the vehicle; and
a controller configured to control whether the intake/exhaust valve is opened and closed and the opening and closing frequency depending on the learning method for controlling opening or closing of an intake/exhaust valve of a vehicle stored in the storage medium and change a mapping value controlling the intake/exhaust valve depending on a change in passing flux of the intake/exhaust valve, by using whether the engine is operated, the current vehicle speed, and whether the accelerator pedal and the brake pedal are operated that are sensed by the sensing unit.

19. The learning apparatus of claim 18, wherein the sensing unit includes:
an engine state sensor configured to sense whether the engine is operated and fuel is injected;
a vehicle speed sensor configured to sense a vehicle speed;
an accelerator pedal position sensor (APS) configured to sense whether an accelerator pedal is operated; and
a brake pedal position sensor (BPS) configured to sense whether a brake pedal is operated.

20. The learning apparatus of claim 18, wherein the intake/exhaust valve includes at least one of an exhaust gas recirculation valve (EGR valve) configured to control the amount of exhaust gas re-circulated to an intake side among exhaust gases emitted from the engine;
an air control valve (ACV) configured to cut off an inhalation from being introduced into the engine after a key-off; and
a swirl control valve (SCV) configured to be mounted in an intake port of the engine to accelerate the flow of air within a combustion chamber.

* * * * *